(12) United States Patent
Legler

(10) Patent No.: US 11,947,994 B2
(45) Date of Patent: Apr. 2, 2024

(54) ADAPTIVE HARDWARE TRANSACTIONAL MEMORY BASED CONCURRENCY CONTROL

(71) Applicant: SAP SE, Walldorf (DE)

(72) Inventor: Thomas Legler, Walldorf (DE)

(73) Assignee: SAP SE, Walldorf (DE)

( * ) Notice: Subject to any disclaimer, the term of this patent is extended or adjusted under 35 U.S.C. 154(b) by 180 days.

(21) Appl. No.: 16/367,910

(22) Filed: Mar. 28, 2019

(65) Prior Publication Data

US 2020/0310862 A1 Oct. 1, 2020

(51) Int. Cl.
*G06F 9/46* (2006.01)
*G06F 9/52* (2006.01)
*G06F 12/0817* (2016.01)
*G06F 16/25* (2019.01)

(52) U.S. Cl.
CPC .......... *G06F 9/467* (2013.01); *G06F 9/52* (2013.01); *G06F 12/0828* (2013.01); *G06F 16/25* (2019.01)

(58) Field of Classification Search
CPC ...... G06F 9/467; G06F 16/25; G06F 12/0828; G06F 9/52; G06F 2212/1024; G06F 2212/465; G06F 12/0868; G06F 12/0871; G06F 9/528
See application file for complete search history.

(56) References Cited

U.S. PATENT DOCUMENTS

| | | | | |
|---|---|---|---|---|
| 9,430,276 B2* | 8/2016 | Busaba | ............... | G06F 13/1663 |
| 10,303,795 B2* | 5/2019 | Vermeulen | .......... | G06F 11/1482 |
| 2006/0074970 A1* | 4/2006 | Narayanan | .......... | G06F 11/3476 707/999.102 |
| 2008/0172429 A1* | 7/2008 | Lin | ...................... | G06F 16/2343 |
| 2015/0242214 A1* | 8/2015 | Busaba | .................... | G06F 9/467 712/207 |
| 2015/0317182 A1* | 11/2015 | Serebrin | ............. | G06F 12/0813 711/119 |
| 2016/0110403 A1* | 4/2016 | Lomet | ................. | G06F 16/2255 707/695 |
| 2016/0299798 A1* | 10/2016 | Bhattacharjee | ......... | G06F 9/467 |
| 2016/0371036 A1* | 12/2016 | Calciu | ..................... | G06F 9/467 |
| 2017/0123992 A1* | 5/2017 | Bradbury | .............. | G06F 3/0622 |
| 2017/0262227 A1* | 9/2017 | Bradbury | ................ | G06F 3/061 |

* cited by examiner

*Primary Examiner* — Amy Ng
*Assistant Examiner* — Yohanes D Kelemework
(74) *Attorney, Agent, or Firm* — Mintz Levin Cohn Ferris Glovsky and Popeo, P.C.

(57) ABSTRACT

A method may include determining a threshold quantity of attempts to optimistically perform a first transaction operating data stored in a database. The threshold quantity of attempts may be determined based on an expected workload of the first transaction and/or a workload at the database. The first transaction may be performed optimistically including by tracking cache lines accessed by the first transaction and detecting, based on a second transaction writing to a cache line accessed by the first transaction, a conflict between the first transaction and the second transaction. If the first transaction is not successful performed after the threshold quantity of attempts to optimistically perform the first transaction, the first transaction may be performed in a fallback mode including by acquiring a lock to prevent the second transaction from accessing a same data in the database as the first transaction. Related systems and articles of manufacture are also provided.

16 Claims, 5 Drawing Sheets

ADAPTIVE HARDWARE TRANSACTIONAL MEMORY BASED CONCURRENCY CONTROL

TECHNICAL FIELD

The subject matter described herein relates generally to database processing and more specifically to hardware transactional memory based concurrency control.

BACKGROUND

A database management system (DBMS) may be configured to store a plurality of data records. In a relational database, the database management system may store the data records as rows in one or more database tables. Moreover, the database management system may operate on the data records stored in the database by executing structure query language (SQL) statements for selecting, updating, inserting, and/or deleting one or more corresponding rows in the database tables. To operate on the data records stored in the database, the database management system may perform one or more memory transactions. A single memory transaction may include a sequence of memory operations (e.g., read, write, and/or the like) on one or more locations in memory. To maintain consistency in the database and to ensure a correct result for each memory transaction, if an error occurs during a memory transaction, the database management system may rollback the memory transaction including by reversing the changes applied to the database by executing the memory transaction.

SUMMARY

Systems, methods, and articles of manufacture, including computer program products, are provided for adaptive hardware transactional memory based concurrency control. In one aspect, there is provided a system. The system may include at least one data processor and at least one memory. The at least one memory may store instructions that result in operations when executed by the at least one data processor. The operations may include: determining a threshold quantity of attempts to optimistically perform a first transaction operating on a memory location, the threshold quantity of attempts being determined based at least on an expected workload of the first transaction and/or a workload at a database at which the first transaction is being performed, and the optimistic performance of the first transaction includes performing the first transaction without acquiring a lock to prevent a second transaction from accessing a same memory location as the first transaction; optimistically performing the first transaction including by tracking one or more cache lines accessed by the first transaction and detecting, based at least on the second transaction writing to a cache line accessed by the first transaction, a conflict between the first transaction and the second transaction; in response to a failure to successfully perform the first transaction after the threshold quantity of attempts to optimistically perform the first transaction, determine to perform the first transaction in a fallback mode including by acquiring the lock to prevent the second transaction from accessing the same memory location as the first transaction.

In some variations, one or more features disclosed herein including the following features may optionally be included in any feasible combination. In response to the failure to successfully perform the first transaction after the threshold quantity of attempts to optimistically perform the first transaction, whether to continue the optimistic performance of the first transaction or to perform the first transaction in the fallback mode may be determined based at least on a cause of a failure of the optimistic performance of the first transaction. The optimistic performance of a plurality of concurrent transactions may be aborted in response to determining to perform the first transaction in the fallback mode.

In some variations, the expected workload of the first transaction may correspond to an expected quantity of cache lines accessed by the first transaction. The workload at the database may correspond to a quantity of cache lines accessed to perform a plurality of transactions at the database.

In some variations, the expected workload of the first transaction may be determined based at least on a metadata associated with the first transaction. The metadata associated with the first transaction may identify a type of queries associated with the first transaction, a type of data associated with the first transaction, and/or a quantity of data associated with the first transaction. The expected workload of the first transaction may be determined to be higher based at least on the first transaction being associated with a scan-type query, complex datatypes, and/or a large quantity of data. The expected workload of the first transaction may be determined to be lower based at least on the first transaction being associated with an equality-type query, simple datatypes, and/or a small quantity of data.

In some variations, the workload at the database may be determined based at least on an average runtime of transactions in the database, one or more datatypes of the data stored in the database, and/or a size of a dictionary associated with the data stored in the database.

In some variations, the threshold quantity of attempts to optimistically perform the first transaction may be further determined based at least on a quantity of available computational resources at the database.

In some variations, the first transaction may be optimistically performed for a larger threshold quantity of attempts based at least on the expected workload of the first transaction and/or the workload at the database being low. The first transaction may be optimistically performed for a smaller threshold quantity of attempts based at least on the expected workload of the first transaction and/or the workload at the database being high.

In some variations, the optimistic performance of the first transaction may further include responding to the conflict between the first transaction and the second transaction by at least aborting the first transaction and the second transaction, and rolling back the first transaction and the second transaction by at least reversing one or more changes applied to the data stored in the database as a result of performing the first transaction and the second transaction.

In another aspect, there is provided a method for adaptive hardware transactional memory based concurrency control. The method may include: determining a threshold quantity of attempts to optimistically perform a first transaction operating on a memory location, the threshold quantity of attempts being determined based at least on an expected workload of the first transaction and/or a workload at a database at which the first transaction is being performed, and the optimistic performance of the first transaction includes performing the first transaction without acquiring a lock to prevent a second transaction from accessing a same memory location as the first transaction; optimistically performing the first transaction including by tracking one or more cache lines accessed by the first transaction and detecting, based at least on the second transaction writing to a cache line accessed by the first transaction, a conflict between the first transaction and the second transaction; in response to a failure to successfully perform the first transaction after the threshold quantity of attempts to optimistically perform the first transaction, determine to perform the first transaction in a fallback mode including by acquiring the lock to prevent the second transaction from accessing the same memory location as the first transaction.

In some variations, one or more features disclosed herein including the following features may optionally be included in any feasible combination. The method may further include: in response to the failure to successfully perform the first transaction after the threshold quantity of attempts to optimistically perform the first transaction, determining, based at least on a cause of a failure of the optimistic performance of the first transaction, whether to continue the optimistic performance of the first transaction or to perform the first transaction in the fallback mode. The optimistic performance of a plurality of concurrent transactions may be aborted in response to determining to perform the first transaction in the fallback mode.

In some variations, the expected workload of the first transaction may correspond to an expected quantity of cache lines accessed by the first transaction. The workload at the database may correspond to a quantity of cache lines accessed to perform a plurality of transactions at the database.

In some variations, the method may further include: determining, based at least on a metadata associated with the first transaction, the expected workload of the first transaction, the metadata associated with the first transaction identifying a type of queries associated with the first transaction, a type of data associated with the first transaction, and/or a quantity of data associated with the first transaction. The expected workload of the first transaction may be determined to be higher based at least on the first transaction being associated with a scan-type query, complex datatypes, and/or a large quantity of data. The expected workload of the first transaction may be determined to be lower based at least on the first transaction being associated with an equality-type query, simple datatypes, and/or a small quantity of data.

In some variations, the method may further include: determining the workload at the database, the workload at the database being determined based at least on an average runtime of transactions in the database, one or more datatypes of the data stored in the database, and/or a size of a dictionary associated with the data stored in the database.

In some variations, the threshold quantity of attempts to optimistically perform the first transaction may be further determined based at least on a quantity of available computational resources at the database.

In some variations, the optimistic performance of the first transaction may further include responding to the conflict between the first transaction and the second transaction by at least aborting the first transaction and the second transaction, and rolling back the first transaction and the second transaction by at least reversing one or more changes applied to the data stored in the database as a result of performing the first transaction and the second transaction.

In another aspect, there is provided a computer program product that includes a non-transitory computer readable storage medium. The non-transitory computer-readable storage medium may include program code that causes operations when executed by at least one data processor. The operations may include: determining a threshold quantity of attempts to optimistically perform a first transaction operating on a memory location, the threshold quantity of attempts being determined based at least on an expected workload of the first transaction and/or a workload at a database at which the first transaction is being performed, and the optimistic performance of the first transaction includes performing the first transaction without acquiring a lock to prevent a second transaction from accessing a same memory location as the first transaction; optimistically performing the first transaction including by tracking one or more cache lines accessed by the first transaction and detecting, based at least on the second transaction writing to a cache line accessed by the first transaction, a conflict between the first transaction and the second transaction; in response to a failure to successfully perform the first transaction after the threshold quantity of attempts to optimistically perform the first transaction, determine to perform the first transaction in a fallback mode including by acquiring the lock to prevent the second transaction from accessing the same memory location as the first transaction.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to adaptive hardware transactional memory based concurrency control, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
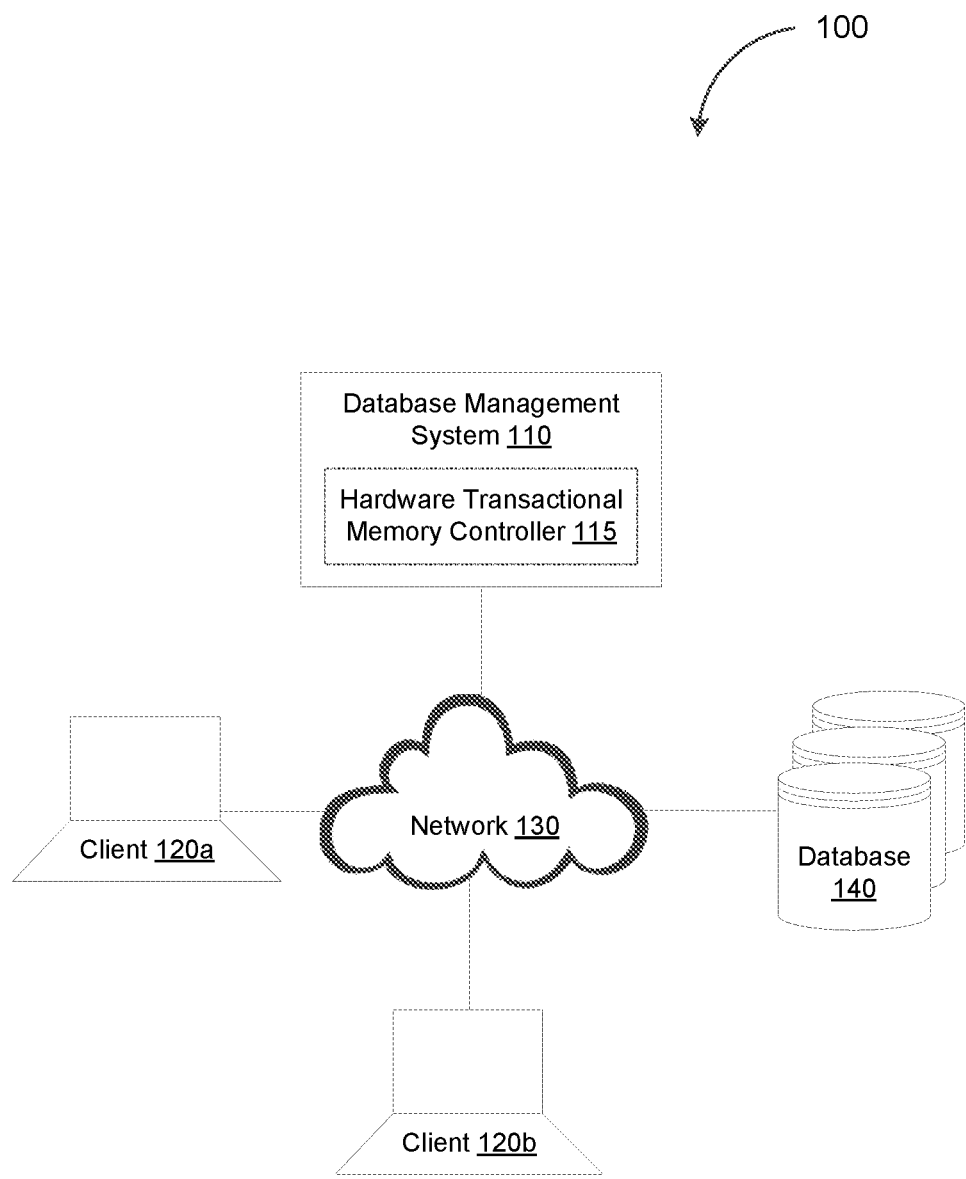
FIG. 1 depicts a system diagram illustrating a database system, in accordance with some example embodiments.

A database management system (DBMS) may be required to simultaneously perform a multitude of memory transactions in order to execute one or more queries operating on data records stored in a database coupled with the database management system. A conflict may occur when multiple memory transactions operate on the same memory locations (e.g., addresses and/or the like) simultaneously. In order to maintain consistency in the database and to ensure a correct result for every transaction, a conventional database management system may implement locking-based concurrency control. With locking-based concurrency control, a memory transaction operating on a memory location may be required to acquire a lock on that memory location to prevent other transactions from simultaneously operating on the same memory location. However, locking-based concurrency control may impose significant overhead including, for example, memory space for storing locks, processor cycles to initialize and/or destroy locks, time for acquiring and/or releasing locks, and/or the like. Moreover, locking-based concurrency control may be inefficient especially when, for example, coarser granularity locks are used. For example, a fine granularity lock may block access to only a small block of memory locations whereas a coarse granularity lock may block access to a large block of memory locations. As such, implementing locking-based concurrency control, especially using coarse granularity locks, may drastically reduce the performance of the database.

In some example embodiments, instead of locking-based concurrency control, a database management system may include a hardware transactional memory controller configured to implement hardware transactional memory based concurrency control, which may minimize the use of locks during the performance of concurrent memory transactions. Hardware transactional memory based concurrency control may enable each memory transaction to be performed optimistically. That is, the hardware transactional memory controller may perform the memory transactions without acquiring any locks on the memory locations accessed by the transactions. In the event a conflict is detected between two or more memory transactions, the hardware transactional memory controller may abort the conflicting memory transactions. Furthermore, the hardware transactional memory controller may rollback the conflicting transactions by at least reversing the changes applied to the data in the database by executing the corresponding memory transactions. It should be appreciated that hardware transactional memory based concurrency control may increase the performance of the database, especially when conflicts between concurrent memory transactions are infrequent.

Hardware acceleration may be used to reduce the overhead associated hardware transactional memory based concurrency control. For example, the hardware transactional memory (HTM) may be implemented by hardware mechanisms including, for example, modifications to processors, cache, bus protocol, and/or the like, to support the detection and/or rollback of conflicting transactions. In some example embodiments, the hardware transactional memory based concurrency control may be implemented using a cache based hardware transaction memory configured to track the cache lines that are accessed by each concurrent transaction. It should be appreciated that a cache line accessed by a transaction may be transferred from a main memory to a cache if the cache line is absent from the cache. With the cache based hardware transactional memory, the hardware transactional memory controller may detect a conflict during the optimistic performance of a memory transaction if a cache line accessed by the memory transaction is being written to by another memory transaction. The hardware transactional memory controller may further rollback conflicting transactions as well as transactions that access a cache line being evicted from the cache.

The hardware transactional memory controller may, as part of hardware transactional memory based concurrency control, optimistically perform a memory transaction for a threshold quantity of attempts. For example, if the memory transaction is aborted due to a conflict with another memory transaction, the hardware transactional memory controller may attempt to optimistically perform the same memory transaction again until the hardware transactional memory controller reaches the threshold quantity of attempts. In some example embodiments, the hardware transactional memory controller may be configured to determine the threshold quantity of attempts to optimistically perform the memory transaction by at least determining the likelihood of successfully performing the transaction optimistically and/or the likelihood of a conflict with another memory transaction. For instance, the hardware transactional memory controller may determine to make more attempts to optimistically perform the memory transaction if the likelihood of success is high and/or the likelihood of conflict is low. By contrast, the hardware transactional memory controller may determine to make fewer attempts to optimistically perform the memory transaction if the likelihood of success is low and/or the likelihood of conflict is high.

The likelihood of successfully performing the memory transaction optimistically and/or the likelihood of conflict with another memory transaction may correspond to the expected workload associated with the memory transaction, the workload at the database, and/or available computational resources at the database (e.g., quantity of central processor units (CPUs), sockets, and/or the like). For example, the rate of conflict between memory transactions may increase while the rate of success of optimistically performed memory transactions may decrease if the workload associated with the memory transaction is high, the database is experiencing a heavy workload, and/or limited computational resources are available at the database. The workload at the database may correspond to the quantity of cache lines that are touched by the transactions accessing the database. Accordingly, in some example embodiments, the hardware transactional memory controller may be configured to determine an expected workload associated with the transaction, the workload at the database, and/or the available computational resources at the database. The hardware transactional memory controller may further determine, based at least on the expected workload associated with the memory transaction, the workload at the database, and/or the available computational resources at the database, the threshold quantity of attempts to optimistically perform the memory transaction. As noted, the hardware transactional memory controller may determine to make more attempts to optimistically perform the transaction if the likelihood of success is high and/or the likelihood of conflict is low.

In some example embodiments, if the hardware transactional memory controller fails to successfully perform the memory transaction after making the threshold quantity of attempts to perform the transaction optimistically, the hardware transactional memory controller may determine, based at least on a cause of the failure, whether to continue optimistically perform the memory transaction or revert to a fallback mode in which a lock is acquired for the memory location accessed by the memory transaction. When the hardware transactional memory controller reverts to the fallback mode, the hardware transactional memory controller may abort the optimistic performance of concurrent memory transactions and perform the memory transactions sequentially. For example, the hardware transactional memory controller may determine to continue performing the memory transaction optimistically if the hardware transactional memory controller determines, based at least on the cause of the failure, that the optimistic performance of the transaction can succeed. Alternatively, the hardware transactional memory controller may determine to revert to the fallback mode if the hardware transactional memory controller determines, based at least on the cause of the failure, that the optimistic performance of the memory transaction cannot succeed. It should be appreciated that the hardware transactional memory controller may determine that the optimistic performance of the transaction cannot succeed if the memory transaction is an illegal operation (e.g., within the scope of the hardware transactional memory) and/or the database has insufficient capacity to support the performance of the transaction.

FIG. 1 depicts a system diagram illustrating a database system 100, in accordance with some example embodiments. Referring to FIG. 1, the database system 100 may include a database management system (DBMS) 110, a first client 120a, a second client 120b, and a database 140. As shown in FIG. 1, the database management system 110, the first client 120a, the second client 120b and the database 140 may be communicatively coupled via a network 130. The network 130 may be any wired and/or wireless network including, for example, a wide area network (WAN), a local area network (LAN), a virtual local area network (VLAN), a public land mobile network (PLMN), the Internet, and/or the like. Meanwhile, the database 140 may be any type of database including, for example, a graph database, an in-memory database, a relational database, a non-SQL (NoSQL) database, and/or the like.

The first client 120a and the second client 120b may interact with the database management system 110 in order to access data stored in the database 140. For example, the first client 120a may send, to the database management system 110, a request to execute a first query (e.g., a structured query language (SQL) statement and/or the like) operating on the data records stored in the database 140. Meanwhile, the second client 120b may send, to the database management system 110, a request to execute a second query (e.g., a SQL statement and/or the like) that also operates on the data records stored in the database 140. Executing the first query and the second query may require the database management system 110 to perform multiple memory transactions. In some example embodiments, the database management system 110 may be configured to support the concurrent performance of the multiple memory transactions.

In some example embodiments, the database management system 110 may include a hardware transactional memory controller 115 configured to implement hardware transactional memory based concurrency control. Accordingly, the hardware transactional memory controller 115 may execute concurrent memory transactions optimistically. For example, the hardware transactional memory controller 115 may execute a first memory transaction and a second memory transaction without acquiring any locks on the memory locations accessed by the first memory transaction and/or the second memory transaction. In the event of a conflict between the first memory transaction and the second memory transaction, the hardware transactional memory controller 115 may abort the first memory transaction and the second memory transaction. Furthermore, the hardware transactional memory controller 115 may rollback the first memory transaction and the second memory transaction including by at least reversing the changes applied to the data stored in the database 140 as a result of executing the queries included in each of the first memory transaction and the second memory transaction.

In some example embodiments, the hardware transactional memory controller 115 may include hardware accelerations to reduce the overhead associated with the implementation of hardware transactional memory based concurrency control. For example, the hardware transactional memory based concurrency controller may be implemented using a cache-based hardware transactional memory configured to support the detection and/or the rollback of conflicting transactions. Accordingly, the hardware transactional memory controller 115 may track the cache lines accessed by the first memory transaction during the optimistic performance of the first memory transaction. A conflict between the first memory transaction and the second memory transaction may be detected if the first memory transaction accesses a cache line being written to by the second memory transaction. In response to detecting the conflict between the first memory transaction and the second memory transaction, the hardware transactional memory controller 115 may roll back the first memory transaction as well as the second memory transaction. Moreover, the hardware transactional memory controller 115 may roll back the first memory transaction and/or the second memory transaction if the first memory transaction and/or the second memory transaction accesses a cache line being evicted from a cache.

Although FIG. 1 depicts the hardware transactional memory controller 115 as being part of the database management system 110 and configured to implement hardware transactional memory based concurrency control at the database system 100, it should be appreciated that the hardware transactional memory controller 115 may be deployed in any system required to support multiple concurrent memory transactions (e.g., reads, writes, and/or the like).

Figure 2:
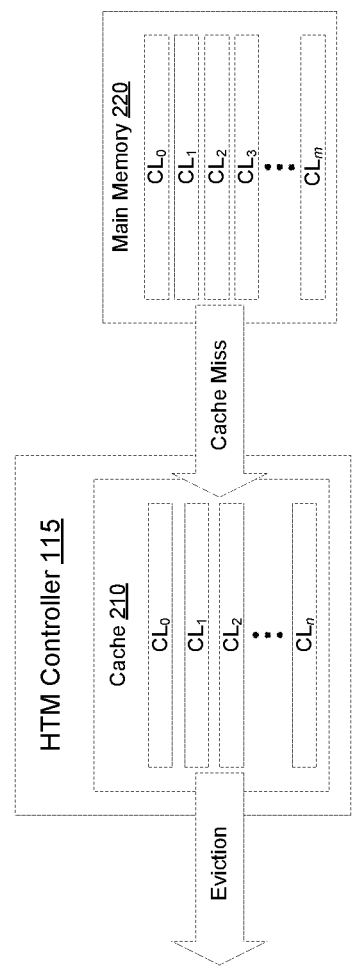
FIG. 2 depicts a block diagram illustrating an example implementation of a concurrency controller implementing hardware transactional memory based concurrency control using a cache-based hardware transactional memory, in accordance with some example embodiments.

To further illustrate, FIG. 2 depicts a block diagram illustrating an example implementation of the hardware transactional memory controller 115 implementing hardware transactional memory based concurrency control using a cache-based hardware transactional memory, in accordance with some example embodiments. Referring to FIGS. 1-2, the hardware transactional memory controller 115 may include a cache 210. Data stored in a main memory 220 may be transferred to the cache 210 in one or more cache lines, each of which being a block of memory having a fixed size (e.g., 64 bytes or 512 bits). It should be appreciated that the main memory 220 may correspond to a portion of the database 140 implemented as a main-memory database.

The cache 210 may be configured to accommodate some but not all of the data stored in the main memory 220. For example, as shown in FIG. 2, the cache 210 may hold up to an n quantity of cache lines, which may include some but not all of an m quantity of cache lines in the main memory 220 (e.g., m>>n). A cache line such as, for example, a first cache line $CL_0$, a second cache line $CL_1$, a third cache line $CL_2$, and/or the like, may be transferred from the main memory 220 to the cache 210 due to a cache miss at the cache 210. A cache miss may occur when the hardware transactional memory controller 115 performs a transaction that requires data from, for example, the first cache line $CL_0$, the second cache line $CL_1$, and/or the third cache line $CL_2$ but the first cache line $CL_0$, the second cache line $CL_1$, and/or the third cache line $CL_2$ are not present in the cache 210. The first cache line $CL_0$, the second cache line $CL_1$, and/or the third cache line $CL_2$ may be transferred from the main memory 220 to the cache 210 by at least storing, in the cache 210, a copy of the first cache line $CL_0$, the second cache line $CL_1$, and/or the third cache line $CL_2$.

In some example embodiments, the hardware transactional memory controller 115 may detect a conflict between a first memory transaction and a second memory transaction if the first memory transaction accesses, for example, the first cache line $CL_0$ while the second memory transaction is writing to the first cache line $CL_0$. That is, the hardware transactional memory controller 115 may detect a conflict between the first memory transaction and the second memory transaction when the first memory transaction is either reading from or writing to the first cache line $CL_0$ while the second memory transaction is writing to the first cache line $CL_0$. In response to detecting the conflict between the first memory transaction and the second memory transaction, the hardware transactional memory controller 115 may roll back the first memory transaction as well as the second memory transaction. Moreover, the hardware transactional memory controller 115 may roll back the first memory transaction and/or the second memory transaction if the first memory transaction and/or the second memory transaction accesses the first cache line $CL_0$ but the first cache line $CL_0$ is being evicted from the cache 210. It should be appreciated that a cache line may be evicted from the cache 210 by at least being replaced and/or overwritten by a different cache line being transferred into the cache 210 from the main memory 220.

The hardware transactional memory controller 115 may be configured to optimistically perform each of the first memory transaction and the second memory transaction for a threshold quantity of attempts. For example, if the first memory transaction from the first client 120a is aborted due to the conflict with the second memory transaction from the second client 120b, the hardware transactional memory controller 115 may attempt to optimistically perform the first memory transaction again until the hardware transactional memory controller 115 reaches the threshold quantity of attempts. In the event the hardware transactional memory controller 115 fails to successfully perform the first memory transaction after making the threshold quantity of attempts to perform the first memory transaction optimistically, the hardware transactional memory controller 115 may determine, based at least on a cause of the failure, whether to continue optimistically perform the first memory transaction or revert to a fallback mode. For example, the hardware transactional memory controller 115 may continue to optimistically perform the first memory transaction and not revert to the fallback mode if the hardware transactional memory controller 115 determines, based at least on the cause of the failure, that the optimistic performance of the first memory transaction can succeed. If the optimistic performance of the first memory transaction cannot succeed, then the hardware transactional memory controller 115 may revert to the fallback mode, in which case the hardware transactional memory controller 115 may abort the optimistic performance of concurrent transactions and perform, for example, the first memory transaction and the second memory transaction sequentially.

In some example embodiments, the hardware transactional memory controller 115 may be configured to determine the threshold quantity of attempts to perform each of the first memory transaction and the second memory transaction. For example, the hardware transactional memory controller 115 may determine the threshold quantity of attempts to optimistically perform the first memory transaction by at least determining the likelihood of successfully performing the first memory transaction optimistically and/or the likelihood of a conflict with another transaction. The likelihood of successfully performing the first memory transaction optimistically and/or the likelihood of the first memory transaction conflicting with another transaction may correspond to the expected workload associated with the first memory transaction, the workload at the database 140, and/or the available computational resources at the database 140.

For instance, the hardware transactional memory controller 115 may determine to make more attempts to optimistically perform the first memory transaction if the likelihood of successfully performing the first memory transaction optimistically is above a threshold value and/or the likelihood of the first memory transaction conflicting with another transaction is below a threshold value. By contrast, the hardware transactional memory controller 115 may determine to make fewer attempts to optimistically perform the first memory transaction if the likelihood of successfully performing the first memory transaction optimistically is below a threshold value and/or the likelihood of the first memory transaction conflicting with another transaction is above a threshold value.

In some example embodiments, the workload at the database 140 may correspond to the quantity of cache lines that are being accessed to perform memory transactions, for example, to execute queries operating on the data records stored in the database 140. As noted, the optimistic performance of memory transactions may be more likely to succeed when the workload at the database 140 is low than when the workload at the database 140 is high. For example, the workload at the database 140 may be high if an average runtime to perform a memory transaction is high because a longer runtime may indicate that the memory transactions being performed at the database require access to a larger quantity of cache lines. The workload at the database 140 may also depend on the types of data being accessed in the database 140. For instance, a single cache line may be able to hold a larger quantity of simple datatypes (e.g., integer values and/or the like) than more complex datatypes (e.g., text values and/or the like). Accordingly, the workload at the database 140 may be higher when performing memory transactions that access more complex datatypes than when performing memory transactions that access simpler datatypes because the performance of the memory transactions that access more complex datatypes may require access to a larger quantity of cache lines. For example, a memory transaction to update a text value may incur a larger workload at the database 140 than a memory transaction to update an integer value because updating the text value may be more convoluted procedurally and require access to a larger quantity of cache lines.

Alternatively and/or additionally, the workload at the database 140 may correspond to the quantity of distinct values stored in the database 140 and/or the size of the dictionary associated with the database 140. When the database 140 is storing a large quantity of distinct values, the size of the corresponding dictionary used to encode the values may be large. Moreover, the workload at the database 140 storing a large quantity of distinct values may also be high because the performance of different transactions to read values from the database 140 may require access to a larger quantity of cache lines. In particular, the insertion of a value in a primary key column of a database table in the database 140 may increase the workload at the database 140 by at least introducing a new distinct value into the database 140 and increasing the size of the corresponding dictionary.

In some example embodiments, the hardware transactional memory controller 115 may determine the expected workload associated with a memory transaction based at least on the metadata accompanying the memory transaction, which may identify the type of queries associated with the memory transaction (e.g., insert, select, and/or the like) and/or the data associated with the memory transaction. For example, the hardware transactional memory controller 115 may determine, based at least on the metadata associated with a memory transaction, that the memory transaction is part of a query to insert data into the database 140. As such, the hardware transactional memory controller 115 may further determine, based on the metadata associated with the transaction, that size of the dataset being inserted into the database 140, the datatypes being inserted into the database 140, and/or the quantity of values not already present in the database 140. It should be appreciated that the hardware transactional memory controller 115 may determine that the expected workload of the memory transaction may be high if the memory transaction is part of a query that requires inserting, into the database 140, a large dataset, complex datatypes (e.g., text values and/or the like), and/or a large quantity of values not already present in the database 140. By contrast, the hardware transactional memory controller 115 may determine that the expected workload of the memory transaction may be low if the memory transaction is part of a query that inserts, into the database 140, a small dataset, simple datatypes (e.g., integer values and/or the like), and/or a small quantity of values not already present in the database 140. As noted, a memory transaction associated with a low expected workload may be more likely to succeed when performed optimistically than a memory transaction associated with a high expected workload.

Alternatively and/or additionally, the hardware transactional memory controller 115 may determine, based at least on the metadata associated with a memory transaction, that the memory transaction is part of a query to select data and/or read data from the database 140. Accordingly, the hardware transactional memory controller 115 may further analyze, based on the metadata associated with the memory transaction, the type of query being executed. For instance, the execution of an equality type query may be more likely to access a smaller quantity of cache lines. As such, the optimistic performance of a memory transaction that is part of an equality type query may have a higher likelihood of success. By contrast, the execution of a scan type query may be more likely to access a larger quantity of cache lines. The hardware transactional memory controller 115 may therefore avoid the optimistic performance of a memory transaction that is part of a scan-type query because such a memory transaction may have a lower likelihood of success.

Figure 3:
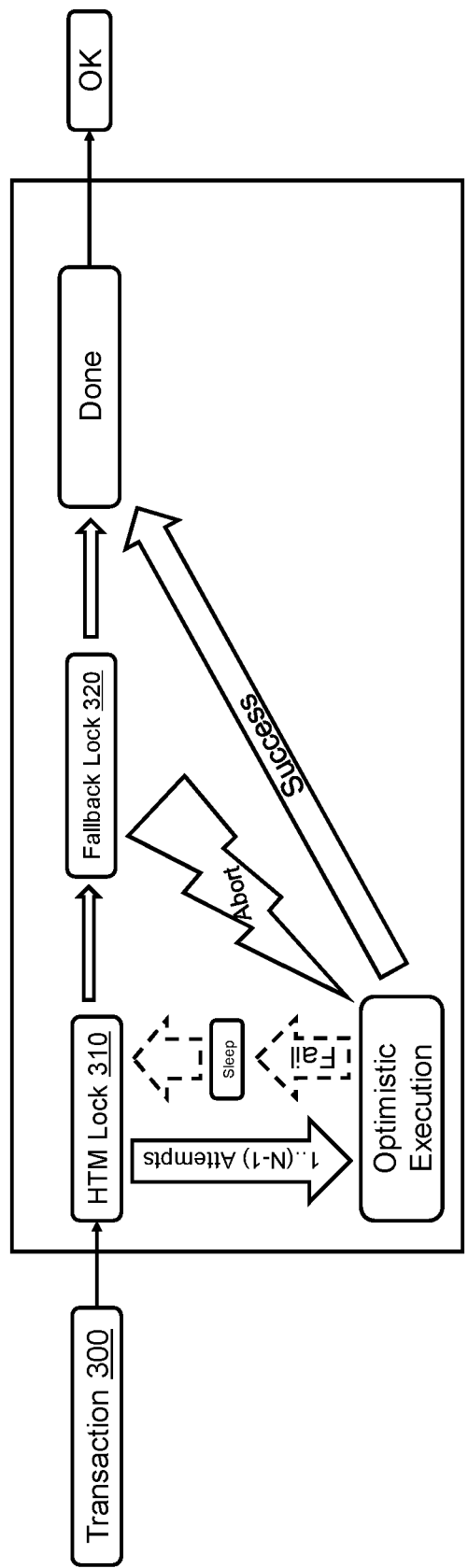
FIG. 3 depicts an example of hardware transactional memory based concurrency control implemented using a cache-based hardware transactional memory, in accordance with some example embodiments.

FIG. 3 depicts an example of hardware transactional memory based concurrency control implemented using a cache-based hardware transactional memory, in accordance with some example embodiments. Referring to FIG. 3, the hardware transactional memory controller 115 perform a memory transaction 300 by at least acquiring a hardware transactional memory (HTM) lock 310 configured to track the cache lines (e.g., the first cache line $CL_0$, the second cache line $CL_1$, the third cache line $CL_2$, and/or the like) accessed by the memory transaction 300. Once the hardware transactional memory lock 300 is acquired for the memory transaction 300, the hardware transactional memory controller 115 may make a threshold quantity (e.g., (N−1)) of attempts to perform the memory transaction 300 optimistically. When the hardware transactional memory controller 115 is performing the memory transaction 300 optimistically, the hardware transactional memory controller 115 may not acquire any locks to block other memory transactions from accessing the same memory locations as the memory transaction 300. Instead, the hardware transactional memory controller 115 may be configured to detect when the memory transaction 300 conflicts with another memory transaction and roll back the conflicting memory transactions.

As noted, the hardware transactional memory controller 115 may make a threshold quantity (e.g., (N−1)) of attempts to perform the memory transaction 300 optimistically. The threshold quantity (e.g., (N−1)) of attempts to perform the memory transaction 300 optimistically may be determined based at least on an expected workload associated with the memory transaction 300, a workload at the database 140, and/or a quantity of available computational resources at the database 140. Moreover, an attempt to perform the memory transaction 300 may fail if the hardware transactional memory controller 115 detects a conflict between the memory transaction 300 and another memory transaction. For example, the hardware transactional memory controller 115 may detect a conflict between the memory transaction 300 and another memory transaction if the hardware transactional memory controller 115 determines that a cache line accessed by the memory transaction 300 is being written to by another memory transaction.

If the hardware transactional memory controller 115 fails to successfully perform the memory transaction 300 after making the threshold quantity (e.g., (N−1)) of attempts, the hardware transactional memory controller 115 may determine whether to continue the optimistic performance of the memory transaction 300 or revert to a fallback mode. For example, the hardware transactional memory controller 115 may determine that the optimistic performance of the memory transaction 300 cannot succeed if the memory transaction 300 is an illegal operation (e.g., within the scope of the hardware transactional memory (HTM)) and/or the database 140 has insufficient capacity to support the performance of the memory transaction 300. In that case, the hardware transactional memory controller 115 may determine to revert to the fallback mode in order to perform the memory transaction 300. As shown in FIG. 3, if the hardware transactional memory controller 115 determines to revert to the fallback mode, the hardware transactional memory controller 115 may acquire a fallback lock 320.

When the hardware transactional memory controller 115 reverts to the fallback mode to perform the memory transaction 300, the hardware transactional memory controller 115 may abort the optimistic performance of concurrent memory transactions. Instead, the hardware transactional memory controller 115 may perform the memory transaction 300 by at least first acquiring a lock to prevent other memory transactions from accessing a same memory locations as the memory transaction 300.

Figure 4:
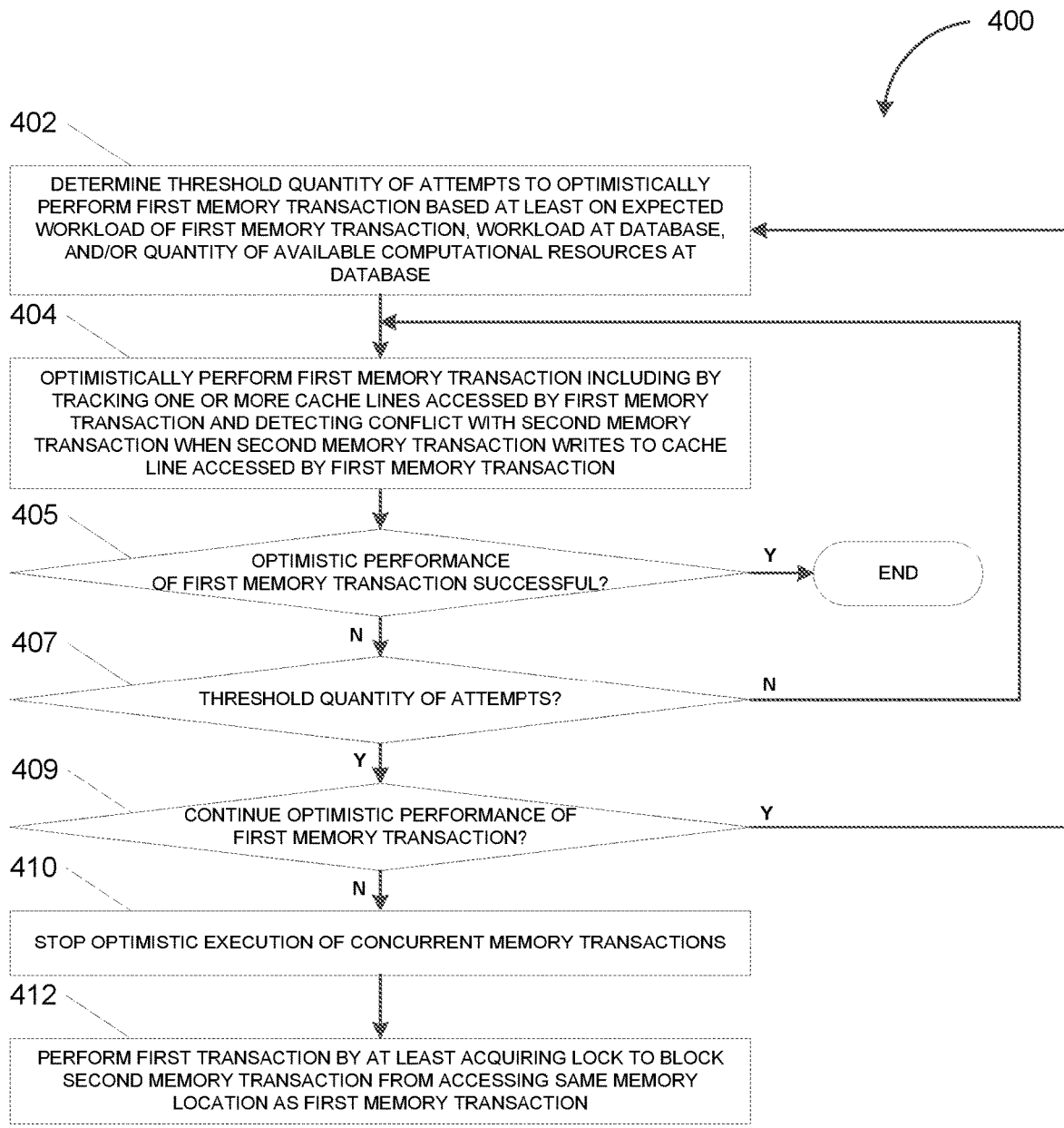
FIG. 4 depicts a flowchart illustrating a process for executing a transaction, in accordance with some example embodiments.

FIG. 4 depicts a flowchart illustrating a process 400 for executing a transaction, in accordance with some example embodiments. Referring to FIGS. 1-4, the process 400 may be performed by the database management system 110, for example, the hardware transactional memory controller 115 in order to perform the memory transaction 300. As noted, in some example embodiments, the hardware transactional memory controller 115 may implement, for example, at the database system 110, hardware transactional memory based concurrency control using a cache-based hardware transactional memory to enable the parallel performance of multiple memory transactions.

At 402, the hardware transactional memory controller 115 may determine a threshold quantity of attempts to optimistically perform a first memory transaction based at least on an expected workload of the first memory transaction, a workload at the database 140, and/or a quantity of available computational resource at the database 140. For example, the hardware transactional memory controller 115 may determine the threshold quantity (e.g., (N−1)) of attempts to perform the transaction 300 optimistically based at least on an expected workload associated with the memory transaction 300, a workload at the database 140, and/or a quantity of available computational resources at the database 140. The expected workload associated with the memory transaction 300, the workload at the database 140, and/or the quantity of available computational resources at the database 140 may determine the likelihood of successfully performing the memory transaction 300 optimistically and/or the likelihood of a conflict with another memory transaction. Accordingly, the hardware transactional memory controller 115 may determine to make more attempts to optimistically perform the memory transaction 300 if the likelihood of successfully performing the memory transaction 300 optimistically is high (e.g., above a threshold value) and/or the likelihood of a conflict with another memory transaction is low (e.g., below a threshold value).

At 404, the hardware transactional memory controller 115 may optimistically perform the first memory transaction including by tracking one or more cache lines accessed by the first memory transaction and detecting a conflict with a second memory transaction when the second memory transaction writes to a cache line accessed by the first memory transaction. In some example embodiments, the hardware transactional memory controller 115 may implement hardware transactional memory based concurrency control using a cache-based hardware transactional memory (HTM). Accordingly, the hardware transactional memory controller 115 may track the cache lines (e.g., the first cache line $CL_0$, the second cache line $CL_1$, and/or the third cache line $CL_2$) accessed by the memory transaction 300 during the optimistic performance of the memory transaction 300. A conflict between the memory transaction 300 and another memory transaction may be detected when the other transaction writes to a cache line accessed by the memory transaction 300. When the hardware transactional memory controller 115 detects a conflict between the memory transaction 300 and another memory transaction, the hardware transactional memory controller 115 may roll back the conflicting memory transactions.

At 405, the hardware transactional memory controller 115 may determine whether the optimistic performance of the first memory transaction is successful. If, at 405-Y, the hardware transactional memory controller 115 determines that the optimistic performance of the first memory transaction is successful, the process 400 may terminate. Alternatively, at 405-N, the hardware transactional memory controller 115 may determine that the optimistic performance of the first memory transaction is unsuccessful. Accordingly, at 407, the hardware transactional memory controller 115 may determine whether the threshold quantity of attempts have been made to optimistically perform the first memory transaction.

At 407-N, the hardware transactional memory controller 115 may determine that the threshold quantity of attempts have not been made to optimistically perform the first memory transaction. Accordingly, the process 400 may resume at operation 404. For instance, the hardware transactional memory controller 115 may continue to optimistically perform the memory transaction 300 including by tracking one or more cache lines accessed by the memory transaction 300 and detecting a conflict with another memory transaction when a cache line accessed by the memory transaction 300 is written to by the other memory transaction. As noted, when the hardware transactional memory controller 115 detects a conflict between the memory transaction 300 and another memory transaction, the hardware transactional memory controller 115 may roll back the conflicting transactions.

Alternatively, at 407-Y, the hardware transactional memory controller 115 may determine that the threshold quantity of attempts have been made to optimistically perform the first memory transaction. As such, at 409, the hardware transactional memory controller 115 may determine whether to continue to the optimistic performance of the first memory transaction. In some example embodiments, the hardware transactional memory controller 115 may determine, based at least on a cause of the failure to successfully perform the memory transaction 300, whether to continue the optimistic execution of the memory transaction 300 or to revert to a fallback mode. For example, the hardware transactional memory controller 115 may determine to continue the optimistic execution of the memory transaction 300 if the cause of the failure indicates that an optimistic performance of the memory transaction 300 can succeed. The optimistic performance of the memory transaction 300 can be successful if the memory transaction 300 is a legal operation (e.g., within the scope of the hardware transactional memory (HTM)) and/or the database 140 has sufficient computational resources to support the performance of the memory transaction 300.

At 409-Y, the hardware transactional memory controller 115 may determine to continue the optimistic performance of the first memory transaction. As such, the process 400 may resume at operation 402 during which the hardware transactional memory controller 115 may determine a threshold quantity of attempts to optimistically perform the memory transaction 300 based at least on an expected workload of the memory transaction 300, a workload at the database 140, and/or a quantity of available computational resource at the database 140. As noted, the hardware transactional memory controller 115 may determine to make more attempts to optimistically perform the memory transaction 300 if the expected workload of the transaction 300, the workload at the database 140, and/or the quantity of available computational resource at the database 140 indicate, for example, an above-threshold likelihood of successfully performing the memory transaction 300 optimistically and/or a below-threshold likelihood of a conflict between the memory transaction 300 and another memory transaction.

Alternatively, at 409-N, the hardware transactional memory controller 115 may determine not to continue the optimistic performance of the first memory transaction. Accordingly, at 410, the hardware transactional memory controller 115 may abort the optimistic performance concurrent memory transactions. Furthermore, at 412, the hardware transactional memory controller 115 may perform the first memory transaction by at least acquiring a lock to block the second memory transaction from accessing a same data in the database 140 as the first memory transaction. For example, the hardware transactional memory controller 115 may determine to discontinue the optimistic performance of the memory transaction 300 if the optimistic performance of the memory transaction 300 cannot be successful due, for example, to the memory transaction 300 being an illegal operation (e.g., within the scope of the hardware transactional memory (HTM)) and/or a lack of sufficient computational resources at the database 140 to support the performance of the memory transaction 300. Instead of continuing to perform the memory transaction 300 optimistically, the hardware transactional memory controller 115 may revert to the fallback mode to perform the memory transaction 300. When the hardware transactional memory controller 115 performs the memory transaction 300 in the fallback mode, the hardware transactional memory controller 115 may abort the optimistic performance of concurrent memory transactions. Moreover, the hardware transactional memory controller 115 may acquire a lock to prevent other memory transactions from accessing a same memory locations as the memory transaction 300 prior to performing the memory transaction 300. It should be appreciated that when the hardware transactional memory controller 115 reverts to the fallback mode, at least a portion of the concurrent memory transactions at the database 140 may be performed sequentially instead.

Figure 5:
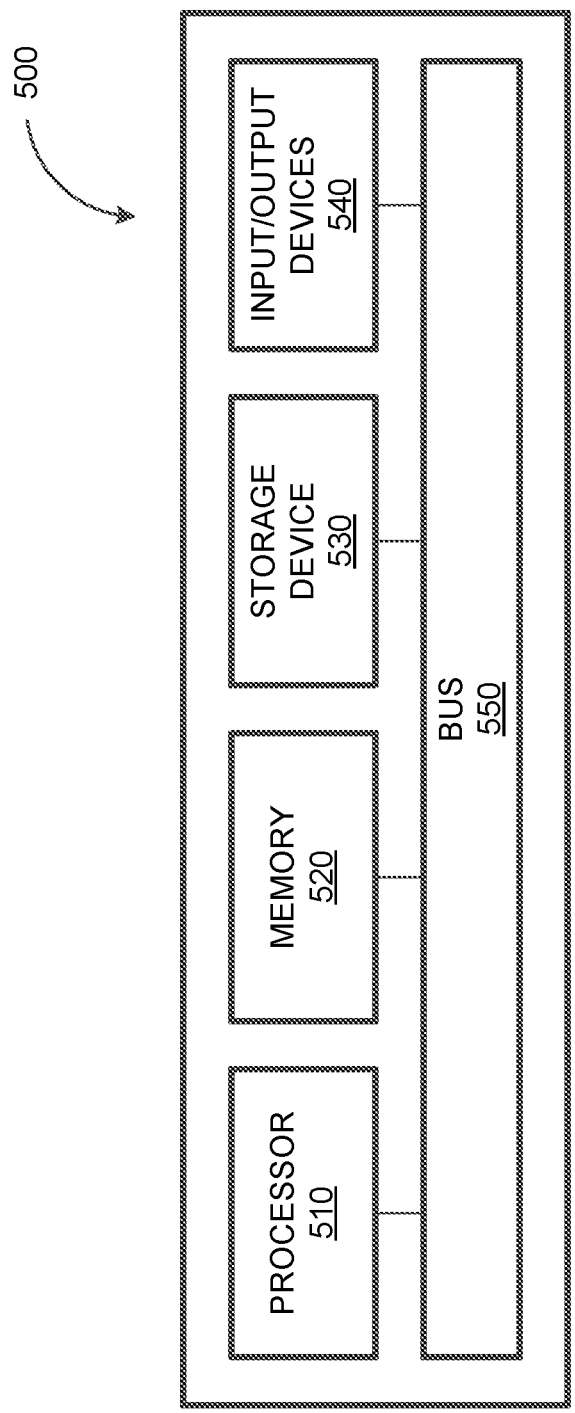
FIG. 5 depicts a block diagram illustrating a computing system, in accordance with some example embodiments.

FIG. 5 depicts a block diagram illustrating a computing system 500 consistent with implementations of the current subject matter. Referring to FIGS. 1 and 5, the computing system 500 can be used to implement the database management system 110 and/or any components therein.

As shown in FIG. 5, the computing system 500 can include a processor 510, a memory 520, a storage device 530, and input/output device 540. The processor 510, the memory 520, the storage device 530, and the input/output device 540 can be interconnected via a system bus 550. The processor 510 is capable of processing instructions for execution within the computing system 500. Such executed instructions can implement one or more components of, for example, the database management system 110. In some example embodiments, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, a tape device, a solid-state device, and/or any other suitable persistent storage means. The input/output device 540 provides input/output operations for the computing system 500. In some example embodiments, the input/output device 540 includes a keyboard and/or pointing device. In various implementations, the input/output device 540 includes a display unit for displaying graphical user interfaces.

According to some example embodiments, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some example embodiments, the computing system 500 can be used to execute various interactive computer software applications that can be used for organization, analysis and/or storage of data in various formats. Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning as an add-in for a spreadsheet and/or other type of program) or can be standalone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system, comprising:
   at least one data processor; and
   at least one memory storing instructions which, when executed by the at least one data processor, result in operations comprising:
   determining an expected quantity of cache lines accessed by a first transaction, the expected quantity of cache lines being determined based on a quantity of data of a datatype accessed by the first transaction that can be held in a single cache line, the expected quantity of cache lines further being determined based on a quantity of unique values present in a database being accessed by the first transaction;
   determining, based at least on the expected quantity of cache lines accessed by the first transaction, an expected workload of the first transaction;
   determining, based at least on the expected workload of the first transaction, a threshold quantity of attempts to optimistically perform the first transaction, the threshold quantity of attempts being inversely proportional to a likelihood of conflict arising from the first transaction operating on a same memory location as a second transaction, the likelihood of conflict corresponding to the expected workload of the first transaction, and the optimistic performance of the first transaction comprises performing the first transaction without acquiring a lock to prevent a second transaction from accessing the same memory location as the first transaction;
   optimistically performing the first transaction comprising by tracking one or more cache lines accessed by the first transaction and detecting, based at least on the second transaction writing to a cache line accessed by the first transaction, a conflict between the first transaction and the second transaction; and
   in response to failing to successfully perform the first transaction after the threshold quantity of attempts to optimistically perform the first transaction,
   determining, based at least on the first transaction being an illegal operation and/or the database lacking capacity to support the performance of the first transaction, to perform the first transaction in a fallback mode that comprises acquiring the lock to prevent the second transaction from accessing the same memory location as the first transaction, and
   determining, based at least on the first transaction being a legal operation and the database having capacity to support the performance of the first transaction, to continue to optimistically perform the first transaction for another threshold quantity of attempts.

2. The system of claim 1, further comprising:
   in response to determining to perform the first transaction in the fallback mode, aborting an optimistic performance of a plurality of concurrent transactions.

3. The system of claim 1, further comprising:
   determining, based at least on a metadata associated with the first transaction, the expected workload of the first transaction, the metadata associated with the first transaction identifying a type of queries associated with the first transaction, a type of data associated with the first transaction, and/or a quantity of data associated with the first transaction.

4. The system of claim 3, wherein the expected workload of the first transaction is determined to be higher based at least on the first transaction being associated with a scan-type query, a complex datatype, and/or a large quantity of data, and wherein the expected workload of the first transaction is determined to be lower based at least on the first transaction being associated with an equality-type query, a simple datatype, and/or a small quantity of data.

5. The system of claim 1, further comprising:
determining the workload at the database, the workload at the database being determined based at least on an average runtime of transactions in the database, one or more datatypes of the data stored in the database, and/or a size of a dictionary associated with the data stored in the database.

6. The system of claim 1, wherein the threshold quantity of attempts to optimistically perform the first transaction is further determined based at least on a quantity of available computational resources at the database.

7. The system of claim 1, wherein the first transaction is optimistically performed for a larger threshold quantity of attempts based at least on the likelihood of conflict being low, and wherein the first transaction is optimistically performed for a smaller threshold quantity of attempts based at least on the likelihood of conflict being high.

8. The system of claim 1, wherein the optimistic performance of the first transaction further comprises responding to the conflict between the first transaction and the second transaction by at least aborting the first transaction and the second transaction, and rolling back the first transaction and the second transaction by at least reversing one or more changes applied to the data stored in the database as a result of performing the first transaction and the second transaction.

9. A computer-implemented method, comprising:
determining an expected quantity of cache lines accessed by a first transaction, the expected quantity of cache lines being determined based on a quantity of data of a datatype accessed by the first transaction that can be held in a single cache line, the expected quantity of cache lines further being determined based on a quantity of unique values present in a database being accessed by the first transaction;
determining, based at least on the expected quantity of cache lines accessed by the first transaction, an expected workload of the first transaction;
determining, based at least on the expected workload of the first transaction, a threshold quantity of attempts to optimistically perform the first transaction, the threshold quantity of attempts being inversely proportional to a likelihood of conflict arising from the first transaction operating on a same memory location as a second transaction, the likelihood of conflict corresponding to the expected workload of the first transaction, and the optimistic performance of the first transaction comprises performing the first transaction without acquiring a lock to prevent a second transaction from accessing the same memory location as the first transaction;
optimistically performing the first transaction comprising by tracking one or more cache lines accessed by the first transaction and detecting, based at least on the second transaction writing to a cache line accessed by the first transaction, a conflict between the first transaction and the second transaction; and
in response to failing to successfully perform the first transaction after the threshold quantity of attempts to optimistically perform the first transaction, determining, based at least on the first transaction being an illegal operation and/or the database lacking capacity to support the performance of the first transaction, to perform the first transaction in a fallback mode that comprises acquiring the lock to prevent the second transaction from accessing the same memory location as the first transaction, and determining, based at least on the first transaction being a legal operation and the database having capacity to support the performance of the first transaction, to continue to optimistically perform the first transaction for another threshold quantity of attempts.

10. The method of claim 9, further comprising:
in response to determining to perform the first transaction in the fallback mode, aborting an optimistic performance of a plurality of concurrent transactions.

11. The method of claim 9, further comprising:
determining, based at least on a metadata associated with the first transaction, the expected workload of the first transaction, the metadata associated with the first transaction identifying a type of queries associated with the first transaction, a type of data associated with the first transaction, and/or a quantity of data associated with the first transaction.

12. The method of claim 11, wherein the expected workload of the first transaction is determined to be higher based at least on the first transaction being associated with a scan-type query, a complex datatype, and/or a large quantity of data, and wherein the expected workload of the first transaction is determined to be lower based at least on the first transaction being associated with an equality-type query, a simple datatype, and/or a small quantity of data.

13. The method of claim 9, further comprising:
determining the workload at the database, the workload at the database being determined based at least on an average runtime of transactions in the database, one or more datatypes of the data stored in the database, and/or a size of a dictionary associated with the data stored in the database.

14. The method of claim 9, wherein the threshold quantity of attempts to optimistically perform the first transaction is further determined based at least on a quantity of available computational resources at the database.

15. The method of claim 9, wherein the optimistic performance of the first transaction further comprises responding to the conflict between the first transaction and the second transaction by at least aborting the first transaction and the second transaction, and rolling back the first transaction and the second transaction by at least reversing one or more changes applied to the data stored in the database as a result of performing the first transaction and the second transaction.

16. A non-transitory computer readable medium storing instructions, which when executed by at least one data processor, result in operations comprising:
determining an expected quantity of cache lines accessed by a first transaction, the expected quantity of cache lines being determined based on a quantity of data of a datatype accessed by the first transaction that can be held in a single cache line, the expected quantity of cache lines further being determined based on a quantity of unique values present in a database being accessed by the first transaction;
determining, based at least on the expected quantity of cache lines accessed by the first transaction, an expected workload of the first transaction;
determining, based at least on the expected workload of the first transaction, a threshold quantity of attempts to optimistically perform the first transaction, the threshold quantity of attempts being inversely proportional to a likelihood of conflict arising from the first transaction operating on a same memory location as a second transaction, the likelihood of conflict corresponding to the expected workload of the first transaction, and the optimistic performance of the first transaction comprises performing the first transaction without acquiring a lock to prevent a second transaction from accessing the same memory location as the first transaction;

optimistically performing the first transaction comprising by tracking one or more cache lines accessed by the first transaction and detecting, based at least on the second transaction writing to a cache line accessed by the first transaction, a conflict between the first transaction and the second transaction; and in response to failing to successfully perform the first transaction after the threshold quantity of attempts to optimistically perform the first transaction, determining, based at least on the first transaction being an illegal operation and/or the database lacking capacity to support the performance of the first transaction, to perform the first transaction in a fallback mode that comprises acquiring the lock to prevent the second transaction from accessing the same memory location as the first transaction, and determining, based at least on the first transaction being a legal operation and the database having capacity to support the performance of the first transaction, to continue to optimistically perform the first transaction for another threshold quantity of attempts.

* * * * *